United States Patent
Carkhuff et al.

[15] 3,659,072
[45] Apr. 25, 1972

[54] CUTTING AND GOUGING ELECTRODE HOLDER

[72] Inventors: Donald Wesley Carkhuff, Wanaque; Harry Charles McGinty, Belleville, both of N.J.

[73] Assignee: Union Carbide Corporation, New York, N.Y.

[22] Filed: Sept. 17, 1970

[21] Appl. No.: 73,151

[52] U.S. Cl. ............................................. 219/70, 219/144
[51] Int. Cl. ........................................................ B23k 37/02
[58] Field of Search ..................... 219/70, 72, 75, 144, 139

[56] References Cited

UNITED STATES PATENTS

| | | |
|---|---|---|
| 2,726,309 | 12/1955 | Stepath .............................. 219/70 |
| 3,483,348 | 12/1969 | Jenkins .............................. 219/70 |
| 3,293,402 | 12/1966 | Graham .............................. 219/99 |

Primary Examiner—R. F. Staubly
Attorney—Paul A. Rose, Harrie M. Humphreys and Dominic J. Terminello

[57] ABSTRACT

Cutting and gouging electrode holder wherein a gas-pressure-responsive means is provided in one of the jaws of said electrode holder to hold the electrode in working position without the aid of a spring means. Pressurized gas is fed to, and through nozzles in, at least one jaw to blow away molten metal. Gas from the same source also operates the gas-pressure-responsive means.

3 Claims, 3 Drawing Figures

PATENTED APR 25 1972
3,659,072
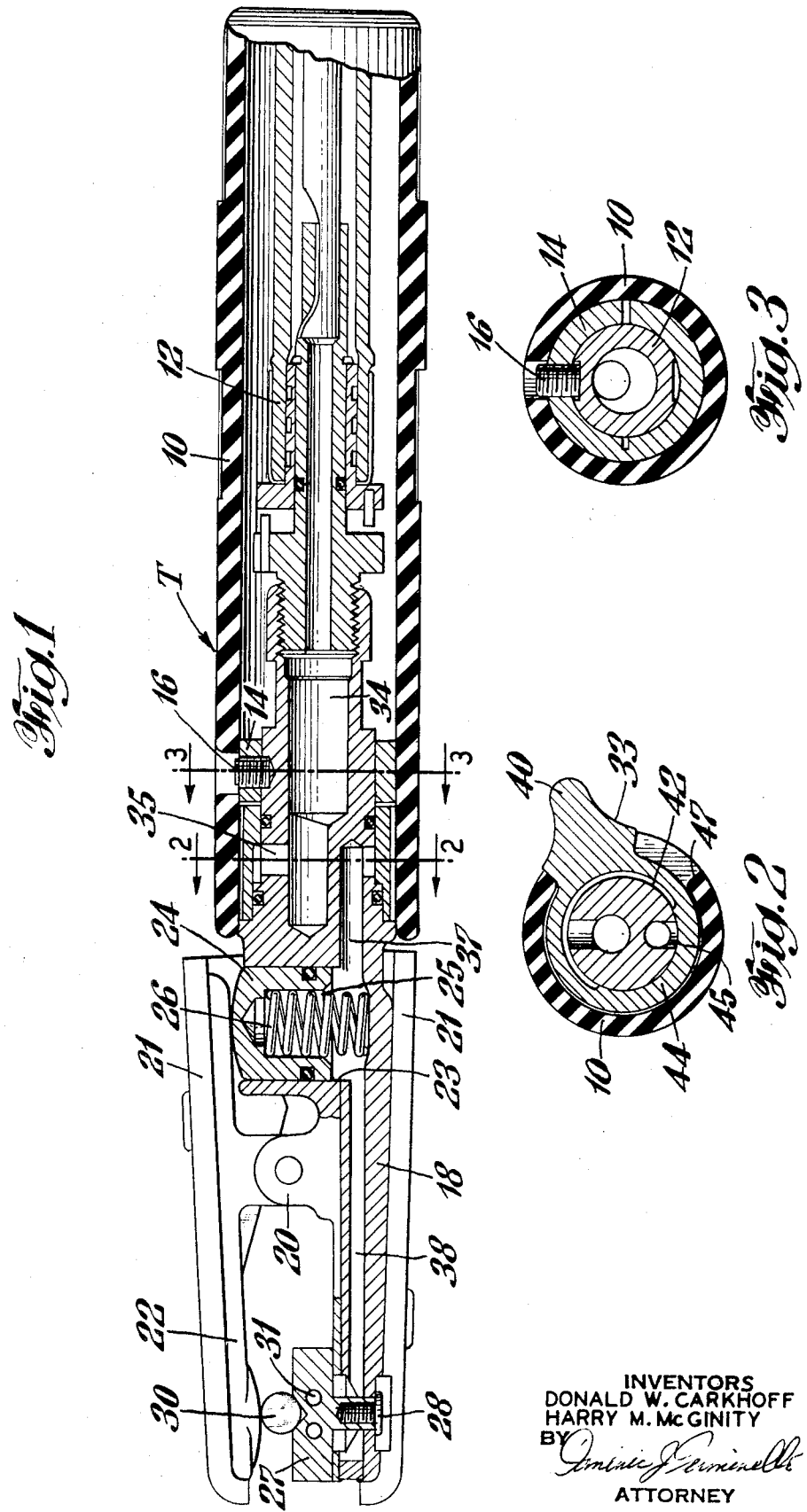
INVENTORS
DONALD W. CARKHOFF
HARRY M. McGINITY
BY
Dominic J. Germinello
ATTORNEY

CUTTING AND GOUGING ELECTRODE HOLDER

This invention relates to an electrode holder. More particularly, the invention relates to an electrode holder for carbon arc-gas jet cutting and gouging torches.

The art of carbon arc-gas cutting is old. Various electrode holders for practicing such cutting and gouging methods have been described in the literature and are available in the market place. Typically, these torches or holders include a pair of jaws for gripping a carbon electrode and a nozzle means mounted on the jaws for directing gas, usually air, along the electrode to the work. In the earlier devices, one of the jaws itself was used as a resilient member which was urged against the other jaw to hold the electrode. This concept had drawbacks in that the size of the electrode was limited by the degree to which the jaws could be opened before the resilience of the jaw itself was exceeded. Later, spring means were used to urge one jaw toward the other to grip the electrode. This had the disadvantage that the spring would lose its resilience from being in the area of the arc. When the spring lost its resilience the electrode would be free to move thereby ruining the cutting or gouging operation.

The main object of the present invention is to provide an electrode holder for carbon arc-gas jet cutting torches which does not rely on a spring for holding the electrode between its jaws.

Another object is to provide an electrode holder having a simplified gas valve arrangement.

Yet another object is to provide an electrode holder having an easily removable handle.

These and other objects will either be pointed out or become apparent from the following description and drawings wherein FIG. 1 is a view partially in cross-section of a typical device incorporating the concept of the invention;

FIG. 2 is a cross-sectional view taken along the line 2—2 of FIG. 1 and

FIG. 3 is a cross-sectional view taken along the line 3—3 in FIG. 1.

Referring now to the drawings and particularly FIG. 1, the torch is shown generally at T and includes a hollow cylindrical handle 10 made of a heat resistant material such as a glass-filled phenolic. Housed within the handle 10 is the torch body 12. The handle 10 is held on the body 12 by a split ring 14 and set screw 16. As the screw is tightened, the split ring 14 expands against the handle 10, thereby securing the same to the body 10. This arrangement simplifies the removal of the handle from the torch body 10. Also, the split ring eliminates handle screws and, therefore, the need for insulating metal screw heads which would normally be electrically hot. The body 10 terminates in a jaw 18 which has a fulcrum 20. Another jaw 22 is pinned to the other jaw 18 at fulcrum 20 by a pin. The jaws 22 and 18 are covered by an insulating material 21 such as glass-filled phenolic.

Provided in jaw 18 is a bore 23 into which is slideably mounted a cup-like member or piston 24 forming a gas chamber 25. Housed in chamber 25 is a light duty spring 26. A gas nozzle 27 is pivotally secured to jaw 18 by screw 28. The nozzle 27 has a groove 29 into which fits electrode 30. The nozzle 27 is free to move with the movement of electrode 30. Nozzle 27 is provided with a plurality of orifice means 31 from which flows a high velocity gas stream which performs the cutting or gouging action. The pressure of gas required to perform the work varies, but usually this torch operates from a gas source having a pressure of from about 80 to about 100 psi.

In normal use, the spring 26 lightly holds the jaw 22 against jaw 18. When the operator wishes to insert an electrode, he depresses the jaw 22 against spring 26 to open the jaws and insert the electrode 30. Then the operator opens gas valve 33 (See FIG. 2) thereby permitting gas to flow through passage 34, into cross passage 35 and through valve 33 into passage 37. The gas fills chamber 25, thereby causing the piston 24 to slide against jaw 22 and urging said jaw into engagement with electrode 30. From this point on, the spring 26 has no function in holding the electrode 30. The gas then flows through passage 38 into nozzle 27 and out orifice 31. The gas pressure in the chamber 25 is usually 70–80 psi when the source pressure is 90 psi.

Gas under pressure exiting from orifices 31 passes alongside the electrode 30 to blow away molten metal from the work in the area of the electric arc. The orifices 31 are, as is known, directed parallel to the electrode to hold the force and effect of the stream of gas acting on the work substantially constant. This is true regardless in variations in electrode length. Thus, it is unnecessary to adjust the jets direction relative to the electrode or to make longitudinal adjustments of the electrode in the holder to compensate for electrode erosion.

Referring more particularly to FIG. 2, the gas valve 33 is a slide type valve which may be adapted for left or right hand use. The valve is made from an insulating material such as glass-filled nylon and has a lever 40 and a slotted section 42. The valve is shown closed in FIG. 2 because the valve body 44 is over the cross gas passage 45 which is a continuation of gas passage 38. To open the valve 33, lever 40 is moved toward the other side 47 of handle 10. In this position the slotted section is over gas passage 45 so that gas may pass from passage 34 into cross passage 35 through slot 42, cross gas passage 45 and gas passage 38 to the orifices 31.

The arrangement for securing the handle 10 to body 12 is shown more clearly in FIG. 3. Threading screw 16 into body 12 spreads the ring 14 so that body 12 is secured to the handle 10. To remove the handle 10, the screw 16 is loosened releasing the split ring 14 so that the handle may be slipped off the body 12.

Having described the invention with respect to certain preferred arrangements of parts, it should be understood that minor modifications thereto may be made without departing from the spirit and scope of the invention.

What is claimed is:

1. An electrode holder for electric arc apparatus including a handle portion, housing a torch body, clamping jaws carried by said body and projecting from said handle portion and operable to grip and hold an electrode in an operative position relative to said handle, one of said jaws having mounted thereon a gas nozzle having orifices therein for directing a jet of gas from a gas passage along said electrode, the improvement which comprises:

A gas chamber formed by a piston member between said jaws communicating with said gas passage and in slidable contact with one of said jaws to thereby urge said clamping jaws toward each other and to hold said electrode therebetween when said gas chamber is filled with gas.

2. Apparatus according to claim 1 including a split ring positioned between said torch body and said handle portion and means for urging said split ring against said handle to thereby secure said handle to said body.

3. Apparatus according to claim 1 including a gas valve mounted in said gas passage and having a lever and a valve body with a slotted section therein, such that when the slotted section is over said gas passage, the valve is opened and gas passes through said torch body to said nozzle, and when the valve body is over said gas passage, the valve is closed.

* * * * *